(12) United States Patent
Liu et al.

(10) Patent No.: US 11,301,082 B2
(45) Date of Patent: Apr. 12, 2022

(54) FINGERPRINT RECOGNITION UNIT AND FABRICATION METHOD THEREOF, FINGERPRINT RECOGNITION MODULE AND DISPLAY DEVICE

(71) Applicant: BOE Technology Group Co., Ltd., Beijing (CN)

(72) Inventors: Wenqu Liu, Beijing (CN); Qi Yao, Beijing (CN); Feng Zhang, Beijing (CN); Zhao Cui, Beijing (CN); Libo Wang, Beijing (CN); Dongfei Hou, Beijing (CN); Xiaoxin Song, Beijing (CN); Zhijun Lv, Beijing (CN); Liwen Dong, Beijing (CN); Detian Meng, Beijing (CN); Jalil Ryu, Beijing (CN); Yang Yue, Beijing (CN); Haitao Huang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/242,511

(22) Filed: Apr. 28, 2021

(65) Prior Publication Data
US 2022/0035503 A1 Feb. 3, 2022

(30) Foreign Application Priority Data
Jul. 30, 2020 (CN) .......................... 202010752411.1

(51) Int. Cl.
*G06F 3/041* (2006.01)
*G06F 3/045* (2006.01)
*G06F 3/044* (2006.01)
*G06K 9/00* (2006.01)

(52) U.S. Cl.
CPC .......... *G06F 3/04164* (2019.05); *G06F 3/045* (2013.01); *G06F 3/0412* (2013.01); *G06F 3/0443* (2019.05); *G06F 3/0446* (2019.05); *G06K 9/00053* (2013.01); *G06F 2203/04103* (2013.01)

(58) Field of Classification Search
None
See application file for complete search history.

(56) References Cited

U.S. PATENT DOCUMENTS 4,931,965 A * 6/1990 Kaneko ................. G06F 3/0433
178/18.04

FOREIGN PATENT DOCUMENTS

CN 110287871 A 9/2019

* cited by examiner

*Primary Examiner* — Stephen T. Reed
(74) *Attorney, Agent, or Firm* — Nath, Goldberg & Meyer; Joshua B. Goldberg (57) ABSTRACT

The present disclosure provides a fingerprint recognition unit and a fabrication method thereof, a fingerprint recognition module and a display device. The fingerprint recognition unit includes: a bearing substrate; a receiving electrode layer on the bearing substrate; a piezoelectric material layer on a side of the receiving electrode layer away from the bearing substrate; and a driving electrode layer on a side of the piezoelectric material layer away from the receiving electrode layer. A density of the driving electrode layer is greater than 5 g/cm$^3$, and a thickness of the driving electrode layer, a thickness of the piezoelectric material layer and a thickness of the bearing substrate are configured such that a vibration nodal plane of the piezoelectric material layer is within the piezoelectric material layer.

19 Claims, 8 Drawing Sheets

FINGERPRINT RECOGNITION UNIT AND FABRICATION METHOD THEREOF, FINGERPRINT RECOGNITION MODULE AND DISPLAY DEVICE

CROSS-REFERENCE TO RELATED APPLICATION

This application claims the benefit of priority to Chinese Patent Application No. 202010752411.1 filed on Jul. 30, 2020, the contents of which are incorporated herein in their entirety by reference.

TECHNICAL FIELD

The present disclosure relates to the field of fingerprint recognition technology, in particular to a fingerprint recognition unit and a fabrication method thereof, a fingerprint recognition module and a display device.

BACKGROUND

The ultrasonic-based fingerprint recognition technology is a new type of fingerprint recognition technology, and the main principle thereof is as follows: when transmitted waves contact an object (such as a finger), since the fingerprint includes valleys and ridges, the vibration intensities of reflected waves (also referred to as echoes) are different, and thus, the positions of the valleys and ridges can be determined by detecting the vibration intensities of the reflected waves, thereby realizing fingerprint recognition.

SUMMARY

The present disclosure provides a fingerprint recognition unit including:

a bearing substrate, a receiving electrode layer on the bearing substrate, a piezoelectric material layer on a side of the receiving electrode layer away from the bearing substrate; and a driving electrode layer on a side of the piezoelectric material layer away from the receiving electrode layer;

wherein a density of the driving electrode layer is greater than 5 g/cm$^3$, and a thickness of the driving electrode layer, a thickness of the piezoelectric material layer and a thickness of the bearing substrate are configured such that a vibration nodal plane of the piezoelectric material layer is within the piezoelectric material layer.

In an embodiment of the present disclosure, the receiving electrode layer includes a plurality of receiving electrodes arranged in an array along a first direction and a second direction intersecting the first direction, and the driving electrode layer includes a plurality of driving electrodes arranged along the first direction, each driving electrode is a strip electrode extending along the second direction, and an orthographic projection of each driving electrode on the bearing substrate overlaps orthographic projections of multiple receiving electrodes arranged along the second direction on the bearing substrate.

In an embodiment of the present disclosure, the orthographic projections of the multiple receiving electrodes arranged along the second direction on the bearing substrate are within the orthographic projection of a corresponding driving electrode on the bearing substrate.

In an embodiment of the present disclosure, a material of the driving electrode layer includes copper.

In an embodiment of the present disclosure, the thickness of the driving electrode layer is in the range of 14 um to 45 um; the thickness of the piezoelectric material layer is in the range of 8 um to 10 um; and the thickness of the bearing substrate is in the range of 90 um to 120 um.

In an embodiment of the present disclosure, the bearing substrate includes: a base substrate and a fingerprint recognition circuit layer on the base substrate, the receiving electrode layer is on a side of the fingerprint recognition circuit layer away from the base substrate; and the fingerprint recognition circuit layer includes a plurality of fingerprint recognition circuits in one-to-one correspondence with the plurality of receiving electrodes, and each fingerprint recognition circuit is electrically connected to a corresponding receiving electrode.

In an embodiment of the present disclosure, the fingerprint recognition unit further includes a passivation layer between the receiving electrode layer and the piezoelectric material layer.

In an embodiment of the present disclosure, a material of the piezoelectric material layer includes: polyvinylidene fluoride.

In an embodiment of the present disclosure, the fingerprint recognition unit further includes: an encapsulation pattern covering a side surface of the piezoelectric material layer.

In an embodiment of the present disclosure, a side surface of the encapsulation pattern away from the piezoelectric material layer is a slope surface, and an included angle between the slope surface and the side surface of the piezoelectric material layer is in the range of 30 to 60 degrees.

In an embodiment of the present disclosure, the fingerprint recognition unit further includes a lead wire arranged along the slope surface, and the lead wire is connected to the driving electrode layer.

In an embodiment of the present disclosure, the fingerprint recognition unit further includes: a protective layer on a side of the driving electrode layer away from the piezoelectric material layer.

In an embodiment of the present disclosure, a material of the protective layer includes an organic resin material, and a thickness of the protective layer is greater than a thickness of the driving electrode layer.

In an embodiment of the present disclosure, a width of the driving electrode is in the range of 65 um to 70 um, an interval between adjacent driving electrodes is in the range of 8 um to 10 um;

the receiving electrode is a rectangular electrode, any side length of the rectangular electrode is in the range of 65 um to 70 um, and an interval between adjacent rectangular electrodes is in the range of 8 um to 10 um.

The present disclosure also provides a fingerprint recognition module including: a plurality of fingerprint recognition units arranged in an array, and the fingerprint recognition unit is the fingerprint recognition unit as described above.

The present disclosure also provides a display device including: the fingerprint recognition module as described above.

The present disclosure also provides a method of fabricating a fingerprint recognition unit, including:

forming a bearing substrate, forming a receiving electrode layer on the bearing substrate;

forming a piezoelectric material layer on a side of the receiving electrode layer away from the bearing substrate; and forming a driving electrode layer on a side of the piezoelectric material layer away from the receiving electrode layer, wherein a density of the driving electrode layer is greater than 5 g/cm³, and a thickness of the driving electrode layer, a thickness of the piezoelectric material layer and a thickness of the bearing substrate are configured such that a vibration nodal plane of the piezoelectric material layer is within the piezoelectric material layer.

In an embodiment of the present disclosure, forming the driving electrode layer includes forming the driving electrode layer having a certain thickness by a metal electroplating process.

In an embodiment of the present disclosure, forming the driving electrode layer having the certain thickness by the metal electroplating process includes: forming a copper film as a seed layer on an entire surface of the piezoelectric material layer away from the bearing substrate by an electroplating process, wherein a thickness of the seed layer is in the range of 3000 Å to 5000 Å;

forming a barrier layer on the seed layer, wherein the barrier layer has a hollow structure, and a thickness of the barrier layer is larger than a thickness of a driving electrode to be formed;

forming a copper film in the hollow structure by an electroplating process to form a growth layer pattern;

removing the barrier layer; and simultaneously thinning the growth layer pattern and the seed layer, so that a portion of the seed layer which is not covered by the growth layer pattern is completely removed, and remaining portion of the growth layer pattern and a portion of the seed layer which is covered by the remaining portion constitute the driving electrode.

DETAILED DESCRIPTION

In order to make those skilled in the art better understand the technical solutions of the present disclosure, a fingerprint recognition unit and a fabrication method thereof, a fingerprint recognition module and a display device provided in the present disclosure are described in detail below with reference to the accompanying drawings.

In the related art, a fingerprint recognition unit includes a driving electrode layer, a piezoelectric material layer, and a receiving electrode layer. A driving electrode in the driving electrode layer generally has a three-layer (molybdenum-aluminum-molybdenum; Mo—Al—Mo) alloy structure. Generally, a first molybdenum film, an aluminum film, and a second molybdenum film are sequentially formed through a sputtering process, and then a pattern of the driving electrode layer is formed through a photolithography process. Due to the limitation of the sputtering process, the thickness of the driving electrode layer having the Mo—Al—Mo structure is relatively small (a total thickness is about 4000 Å). In this case, a vibration nodal plane of the piezoelectric material layer is located outside the piezoelectric material layer, and the difference of signals formed by ultrasonic waves reflected by the valleys and the ridges is significantly reduced, which is not favorable for fingerprint imaging, i.e., does not meet the requirement of acoustic matching.

To meet the requirement of acoustic matching, an isolation layer and a metal reflective layer (also referred to as an acoustic matching layer) are typically disposed on a side of the driving electrode layer away from the piezoelectric material layer. A material of the isolation layer is generally silicon nitride (SiNx), a material of the metal reflective layer includes silver (Ag), and the metal reflective layer is used for reflecting an ultrasonic wave generated by the piezoelectric material layer to adjust the position of the vibration nodal plane of the piezoelectric material layer, so that the vibration nodal plane of the piezoelectric material layer is located in the piezoelectric material layer, thereby meeting the requirement of acoustic matching.

However, the technical solution of providing the isolation layer and the metal reflective layer has at least the following problems: firstly, since the heat-resisting temperature of the piezoelectric material layer is low, the isolation layer can only be formed by a TFE (thin Film encapsulation) process, resulting in that new equipment investment is required in mass production; secondly, after the driving electrode is powered on, parasitic capacitance is generated between the driving electrode and the metal reflective layer, breakdown is likely to occur between the driving electrode and the metal reflective layer to cause short circuit, and an excitation voltage on the driving electrode cannot be increased, leading to a reduced signal quantity of the device, and the like. As a result, the fingerprint recognition performance of the device is impaired.

In order to solve at least one technical problem of the related art, embodiments of the present disclosure provide corresponding solutions, which will be described in detail below with reference to specific embodiments.

Figure 1:
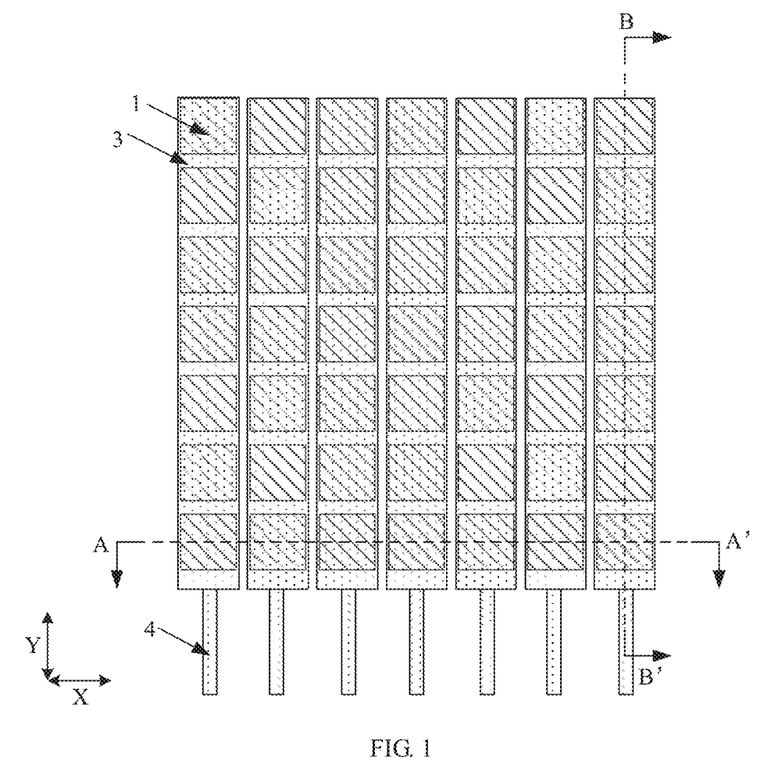
FIG. 1 is a top view of a fingerprint recognition unit according to an embodiment of the present disclosure.
Figure 2:
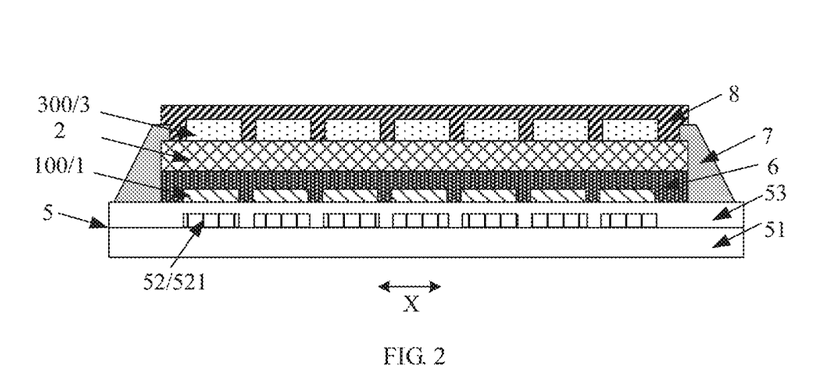
FIG. 2 is a cross-sectional view taken along line A-A' of FIG. 1.
Figure 3:
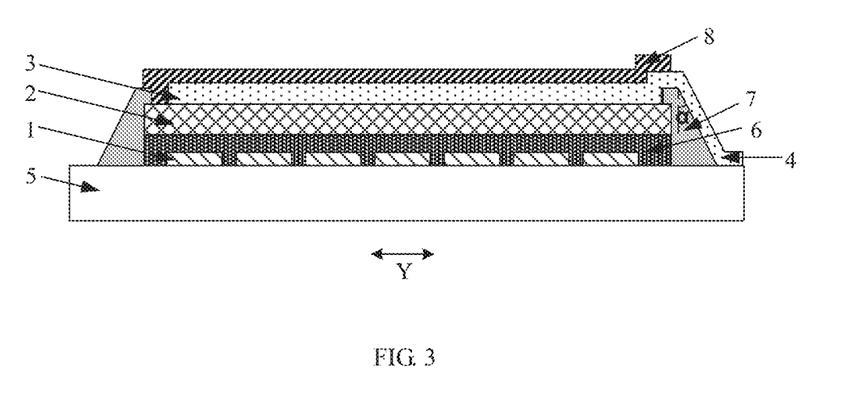
FIG. 3 is a cross-sectional view taken along line B-B' of FIG. 1.

FIG. 1 is a top view of a fingerprint recognition unit according to an embodiment of the present disclosure, FIG. 2 is a cross-sectional view taken along line A-A' of FIG. 1, and FIG. 3 is a cross-sectional view taken along line B-B' of FIG. 1. As shown in FIGS. 1 to 3, the fingerprint recognition unit includes: a bearing substrate 5; a receiving electrode layer 100 on the bearing substrate 5; a piezoelectric material layer 2 on a side of the receiving electrode layer 100 away from the bearing substrate 5, and a driving electrode layer 300 on a side of the piezoelectric material layer 2 away from the receiving electrode layer 100.

In an embodiment of the present disclosure, the receiving electrode layer 100 includes a plurality of receiving electrodes 1, and the plurality of receiving electrodes 1 are arranged in an array along a first direction X and a second direction Y. The first direction X intersects the second direction Y. For example, the first direction X and the second direction Y are perpendicular to each other. Hereinafter, an example will be described in which the first direction X is a horizontal direction in FIG. 1 and the second direction Y is a vertical direction in FIG. 1. The driving electrode layer 300 includes: a plurality of driving electrodes 3 arranged along the first direction X, the driving electrodes 3 are strip electrodes extending along the second direction Y, and an orthographic projection of each driving electrode 3 on the bearing substrate 5 overlaps orthographic projections of multiple receiving electrodes 1 arranged along the second direction Y on the bearing substrate 5. In some embodiments, the orthographic projections of the multiple receiving electrodes 1 arranged along the second direction Y on the bearing substrate 5 are within the orthographic projection of the corresponding driving electrode 3 on the bearing substrate 5. A density of the driving electrode layer 300 is greater than 5 g/cm$^3$, and a thickness of the driving electrode layer 300, a thickness of the piezoelectric material layer 2, and a thickness of the bearing substrate 5 are configured such that the vibration nodal plane of the piezoelectric material layer 2 is within the piezoelectric material layer 2.

The process of performing ultrasonic fingerprint recognition by the fingerprint recognition unit according to the embodiment of the present disclosure is as follows: in a transmitting stage, a driving signal (e.g., a sine wave signal) may be applied to the driving electrode 3, and at the same time, a constant voltage is applied to the receiving electrode 1, so that the piezoelectric component is excited by a voltage to generate an inverse piezoelectric effect, and transmits an ultrasonic wave outwards, and the transmitted ultrasonic wave is reflected when contacting an object (e.g., a finger), so as to generate echoes; since the fingerprint of the finger includes the valleys and the ridges, the vibration intensities of the echoes corresponding to the valleys and the ridges are different. In a sampling stage, the applying of the driving signal to the driving electrode 3 is stopped, instead, a constant voltage is applied to the driving electrode 3, and the applying of the constant voltage to the receiving electrode 1 is stopped, so that the piezoelectric component is influenced by echoes fed back by the finger to generate an alternating current (AC) signal (which is a sine wave signal or an approximate sine wave signal) on the receiving electrode 1 due to a positive piezoelectric effect, the AC signal can charge sampling nodes, and positons of the valleys and ridges of the finger can be determined by measuring amplitudes (maximum voltages, also called maximum peak voltages) of the signals at the sampling nodes, thereby realizing the ultrasonic fingerprint recognition.

For the purpose of acoustic matching, the density of the driving electrode 3 needs to be greater than 5 g/cm$^3$, and the thickness of the driving electrode layer 300, the thickness of the piezoelectric material layer 2, and the thickness of the bearing substrate 5 need to satisfy a certain mathematical relationship such that the nodal plane of the piezoelectric material layer 2 is located within the piezoelectric material layer.

In an embodiment of the present disclosure, the maximum thickness of a metal material film formed by a metal electroplating process can reach tens of micrometers or even approximately hundreds of micrometers, which is much greater than the maximum thickness of a metal material film formed by the sputtering process. Therefore, the driving electrode 3 formed by the metal electroplating process can not only have a function of loading signals to realize fingerprint recognition driving, but also make the vibration nodal plane of the piezoelectric material layer 2 be within the piezoelectric material layer 2 through thickness design, so as to achieve acoustic matching, namely the driving electrode 3 can play a role of an acoustic matching layer in the related art.

In an embodiment of the present disclosure, the metal material suitable for the electroplating process includes: silver, copper, nickel, gold, and the like. In consideration of production cost, difficulty of the electroplating process, and other factors, the material of the driving electrode 3 in the embodiment of the present disclosure is preferably copper. In practical applications, copper has the characteristics of low resistance (small voltage drop) and high density (high acoustic impedance), can completely reflect ultrasound, and increases the signal transmission.

The driving electrode 3 in the fingerprint recognition unit according to the embodiments of the present disclosure can not only realize fingerprint recognition driving, but also function as the acoustic matching layer. Therefore, the fingerprint recognition unit according to the embodiments of the present disclosure does not need to be additionally provided with the acoustic matching layer and the isolation layer, so that the device structure is simplified, and short circuit caused by breakdown between the driving electrode 3 and the acoustic matching layer is effectively avoided.

In some embodiments, the material of the piezoelectric material layer 2 includes: polyvinylidene fluoride (PVDF for short), and the thickness of the piezoelectric material layer 2 is in the range of 8 um to 10 um.

In some embodiments, the width of the driving electrode 3 is in the range of 65 um to 70 um, the interval between adjacent driving electrodes 3 is in the range of 8 um to 10 um, the length of the driving electrode 3 is approximately equal to that of the fingerprint recognition unit; the receiving electrode 1 is a rectangular electrode, and any side length of the rectangular electrode is in the range of 65 um to 70 um, and the interval between adjacent rectangular electrodes is in the range of 8 um to 10 um.

In some embodiments, the bearing substrate 5 includes: a base substrate 51 and a fingerprint recognition circuit layer 52 on the base substrate 51, the receiving electrode layer 100 is on a side of the fingerprint recognition circuit layer 52 away from the base substrate 51; the fingerprint recognition circuit layer 52 includes a plurality of fingerprint recognition circuits 521 in one-to-one correspondence with the receiving electrodes 1, and the fingerprint recognition circuit 521 is electrically connected to the corresponding receiving electrode 1. The fingerprint recognition circuit 521 is configured to provide a constant voltage to the receiving electrode 1 during the transmitting stage, and to receive the AC signal generated on the receiving electrode 1 and provide the AC signal to an external processor for processing during the sampling stage.

In some embodiments, a planarization layer 53 is disposed between the fingerprint recognition circuit layer 52 and the receiving electrode 1, and the receiving electrode 1 is electrically connected to the corresponding fingerprint recognition circuit 521 through a via hole in the planarization layer 53.

It should be noted that the fingerprint recognition circuit is formed by electrical devices such as a thin film transistor and the like, the fingerprint recognition circuit in the embodiment of the present disclosure may be any conventional fingerprint recognition circuit, and the specific circuit structure of the fingerprint recognition circuit is not limited.

In some embodiments, the fingerprint recognition unit further includes a passivation layer 6 disposed between the receiving electrode layer 100 and the piezoelectric material layer 2. As shown in FIG. 2, the passivation layer 6 is disposed between adjacent receiving electrodes 1 and between the receiving electrodes 1 and the piezoelectric material layer 2. It should be noted that the passivation layer 6 is provided to effectively prevent short circuit between adjacent receiving electrodes 1.

In some embodiments, the thickness of the bearing substrate is in the range of 90 um to 120 um.

In some embodiments, the fingerprint recognition unit further includes: an encapsulation pattern 7, and the encapsulation pattern 7 covers a side surface of the piezoelectric material layer 2. The encapsulation pattern 7 can protect the fingerprint recognition unit.

In practical applications, each driving electrode 3 needs to be led out through a corresponding lead wire 4 so that an external signal can be written to the driving electrode 3. Due to the step difference between the driving electrode 3 and the bearing substrate, there is a great risk of wire breakage if the lead wire 4 is vertically arranged. In some embodiments, a side surface of the encapsulation pattern 7 away from the piezoelectric material layer 2 is a slope surface, and an included angle α between the slope surface and the side surface of the piezoelectric material layer 2 is in the range of 30 to 60 degrees. In this way, the lead wire 4 can be smoothly arranged along the slope surface, and the risk of breakage of the lead wire 4 can be effectively reduced.

In some embodiments, the fingerprint recognition unit further includes: a protective layer 8 on a side of the driving electrodes 3 away from the piezoelectric material layer 2. The protective layer 8 can be used to protect the driving electrodes 3.

In some embodiments, the material of the protective layer 8 includes an organic resin material, and the thickness of the protective layer 8 is greater than the thickness of the driving electrode 3. In order to ensure the protection effect, an organic resin material with high viscosity is selected as the material of the protective layer 8, and in this case, the organic resin material may be formed on the surface of the driving electrode 3 by a screen printing technology. In order to ensure complete coverage of the driving electrode 3 with the organic resin material, the thickness of the protective layer 8 needs to be greater than the thickness of the driving electrode 3.

The selection of the material and thickness of the driving electrode 3 in the embodiments of the present disclosure will be described in detail with reference to specific examples.

Since the driving electrode 3 is used for loading signals, the sheet resistance of the driving electrode 3 is generally required to be less than 0.05Ω/□ in order to avoid signal distortion; in addition, for acoustic matching, the density of the driving electrode 3 is required to be more than 5 g/cm$^3$. In this case, silver, copper, and nickel among the metal materials suitable for the electroplating process meet the above requirements.

By taking the case that the material of the piezoelectric material layer 2 is PVDF and the thickness thereof is about 9 um, and the thickness of the bearing substrate is about 90 um as an example, the required thicknesses of the driving electrodes 3 of different metal materials are simulated when the fingerprint recognition unit operates at 10 MHZ, 11 MHZ, 12 MHZ, and 13 MHZ, and the required thickness of the driving electrode 3 can make the vibration nodal plane of the piezoelectric material layer 2 be within the piezoelectric material layer 2, as shown in Table 1 below.

Table 1. correspondence table of required thicknesses of driving electrodes of different materials under different operation frequencies

| Operation Frequency (MHZ) | Film Thicknesses of Different Materials (um) | | |
| --- | --- | --- | --- |
| | Ag | Cu | Ni |
| 10 | 35~39 | 42~45 | 45~50 |
| 11 | 23~25 | 28~31 | 30~32 |
| 12 | 11 | 20~22 | 21~23 |
| 13 | 16 | 14~16 | 16~17 |

The material of the driving electrode 3 is preferably copper, and the thickness thereof is in the range of 14 um to 45 um, in consideration of the film forming process, the production cost, and other factors.

Figure 4:
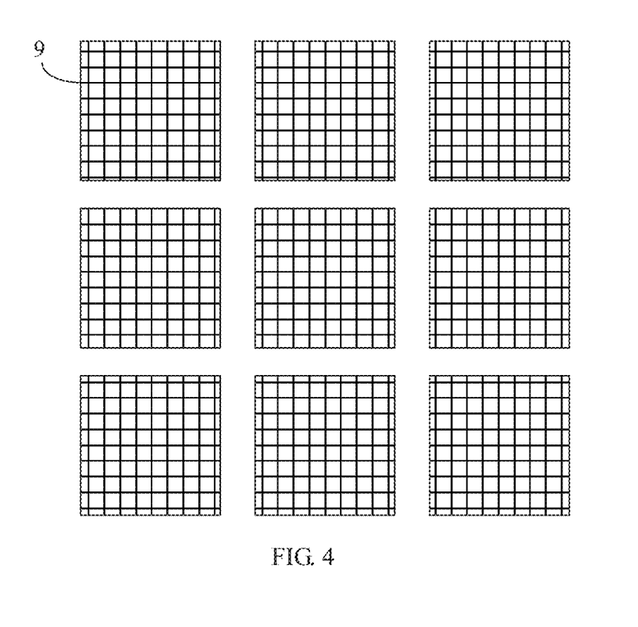
FIG. 4 is a top view of a fingerprint recognition module according to an embodiment of the present disclosure.

FIG. 4 is a top view of a fingerprint recognition module according to an embodiment of the present disclosure. As shown in FIG. 4, the fingerprint recognition module includes a plurality of fingerprint recognition units 9 arranged in an array, and the fingerprint recognition unit 9 is the fingerprint recognition unit described in the above embodiments. The driving electrodes in each fingerprint recognition unit 9 are connected to external connection terminals (also called pads, not shown) through corresponding lead wires (not shown).

The embodiments of the present disclosure also provide a display device, including a fingerprint recognition module, and the fingerprint recognition module is the fingerprint recognition module described in the above embodiments.

In some embodiments, the display device further includes a display module, and the display module has approximately the same size as the fingerprint recognition module, so that full-screen fingerprint recognition can be realized. In some embodiments, the fingerprint recognition module and the display module may be adhered and fixed to each other by an adhesive layer.

The display device in the embodiments of the present disclosure may be an electronic device with a display function, such as a television, a mobile phone, a computer, a notebook computer, an electronic photo album, a navigator or the like.

Figure 5:
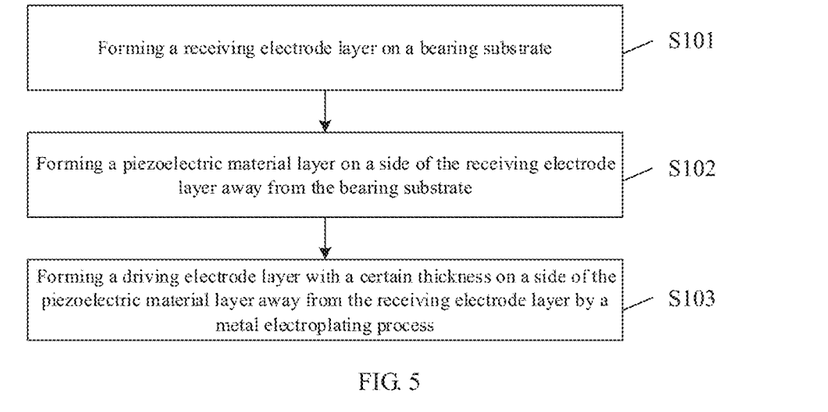
FIG. 5 is a flow chart of a method of fabricating a fingerprint recognition unit according to an embodiment of the present disclosure.

FIG. 5 is a flow chart of a method of fabricating a fingerprint recognition unit according to an embodiment of the present disclosure. As shown in FIG. 5, the method may be used to fabricate the fingerprint recognition unit provided in the forgoing embodiments, and includes steps S101 to S103.

In step S101, a receiving electrode layer is formed on a bearing substrate. The receiving electrode layer may include a plurality of receiving electrodes arranged in an array along a first direction and a second direction.

In some embodiments, before forming the receiving electrodes on the bearing substrate, the method further includes: providing a base substrate and forming a fingerprint recognition circuit layer on the base substrate. The fingerprint recognition circuit layer includes a thin film transistor, and the step of forming the fingerprint recognition circuit layer includes: forming a gate electrode, forming an active layer and forming a source/drain electrode, which can be performed by the existing thin film transistor fabrication process.

In some embodiments, the thin film transistor in the fingerprint recognition circuit layer is a complementary metal oxide semiconductor (CMOS) transistor, and in this case, the fingerprint recognition circuit layer may be fabricated based on a CMOS transistor fabrication process.

It should be noted that, after the fingerprint recognition circuit layer is formed, a planarization layer may be further formed on the fingerprint recognition circuit layer to facilitate the fabrication of subsequent structures. In this case, the receiving electrode is electrically connected to the corresponding fingerprint recognition circuit through a via hole in the planarization layer.

In step S102, a piezoelectric material layer is formed on a side of the receiving electrode layer away from the bearing substrate.

In step S103, a driving electrode layer with a certain thickness is formed on a side of the piezoelectric material layer away from the receiving electrode layer by a metal electroplating process. The driving electrode layer may include a plurality of driving electrodes arranged along the first direction, the driving electrodes are strip electrodes extending along the second direction, and an orthographic projection of the driving electrode on the bearing substrate overlaps orthographic projections of multiple receiving electrodes arranged along the second direction on the bearing substrate. The density of the driving electrode layer is greater than 5 g/cm$^3$, and the thickness of the driving electrode layer, the thickness of the piezoelectric material layer, and the thickness of the bearing substrate are configured such that the nodal plane of the piezoelectric material layer is located within the piezoelectric material layer.

Based on steps S101 to S103, the fingerprint recognition unit provided in the forgoing embodiments can be fabricated. In the fingerprint recognition unit according to the present disclosure, the driving electrode can not only realize fingerprint recognition driving, but also function as the acoustic matching layer. Therefore, the fingerprint recognition unit according to the embodiments of the present disclosure does not need to be additionally provided with the acoustic matching layer and the isolation layer, so that the device structure is simplified, and short circuit caused by breakdown between the driving electrode and the acoustic matching layer is effectively avoided.

Figure 6:
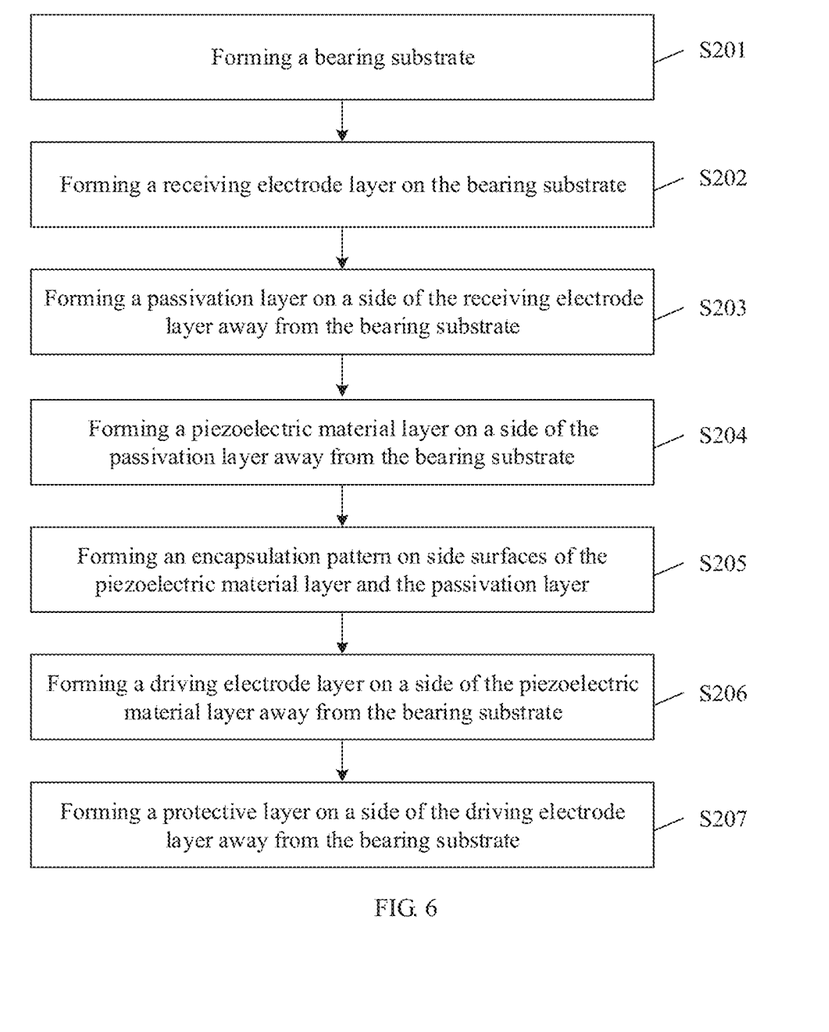
FIG. 6 is a flow chart of another method of fabricating a fingerprint recognition unit according to an embodiment of the present disclosure.
Figure 7A:
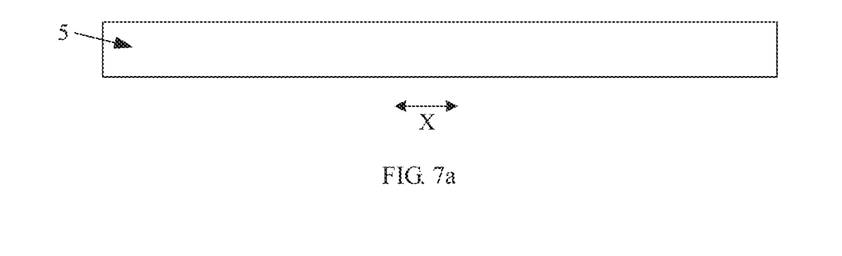
FIGS. 7a to 7j are schematic diagrams of intermediate structures in the process of fabricating a fingerprint recognition unit using the method shown in FIG. 6.
Figure 7B:
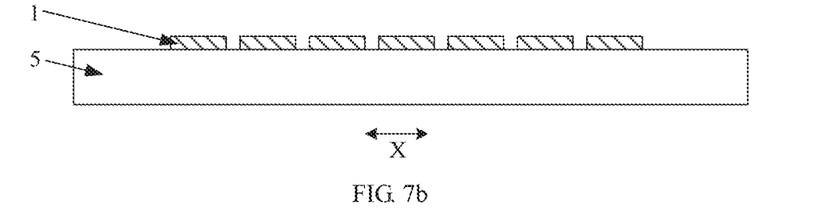
Figure 7C:
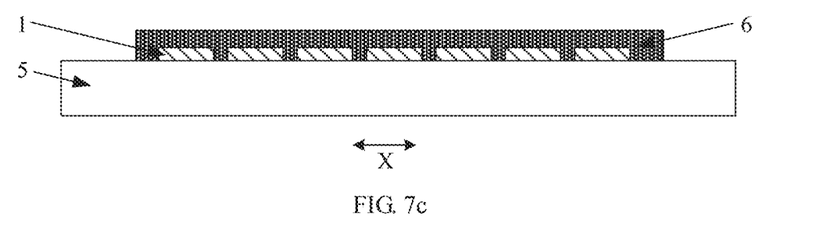
Figure 7D:
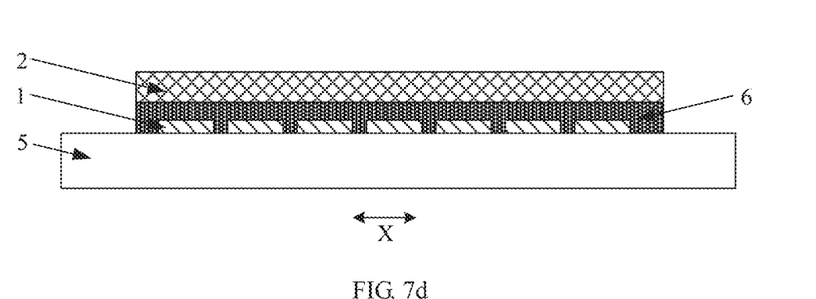
Figure 7E:
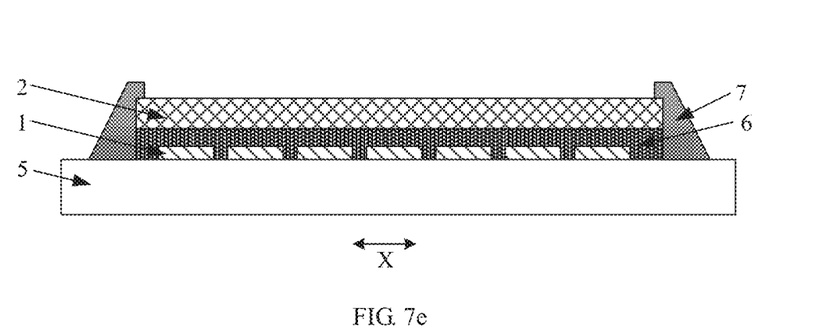
Figure 7F:
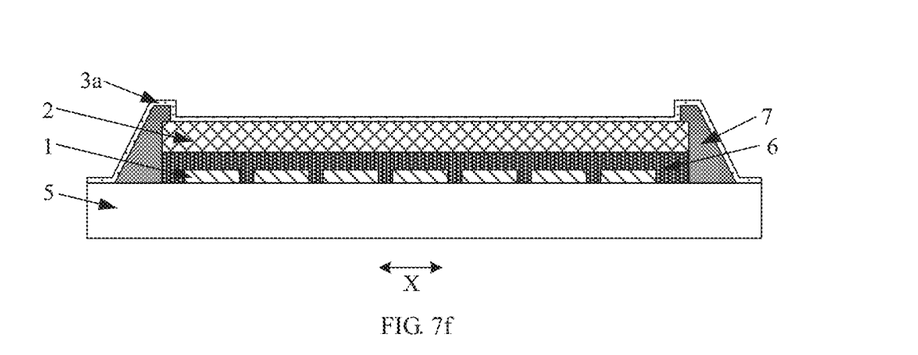
Figure 7G:
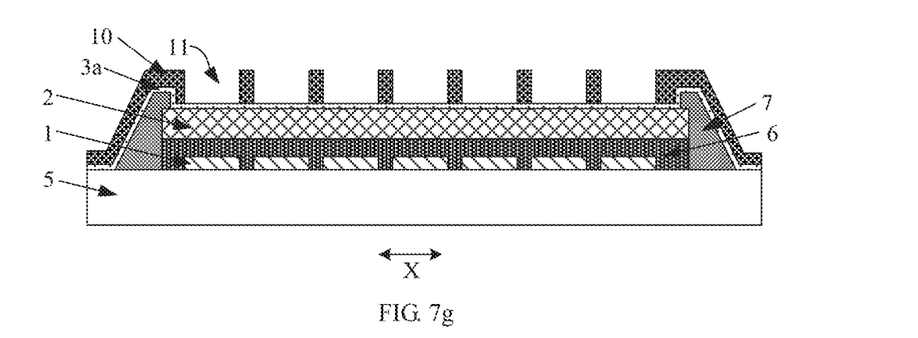
Figure 7H:
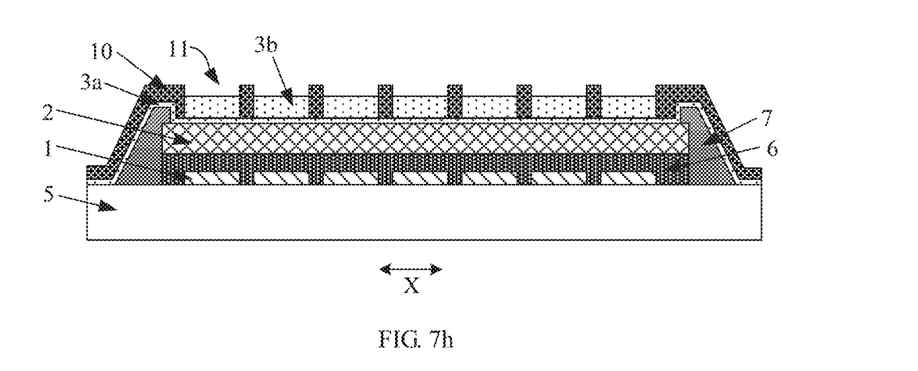
Figure 7I:
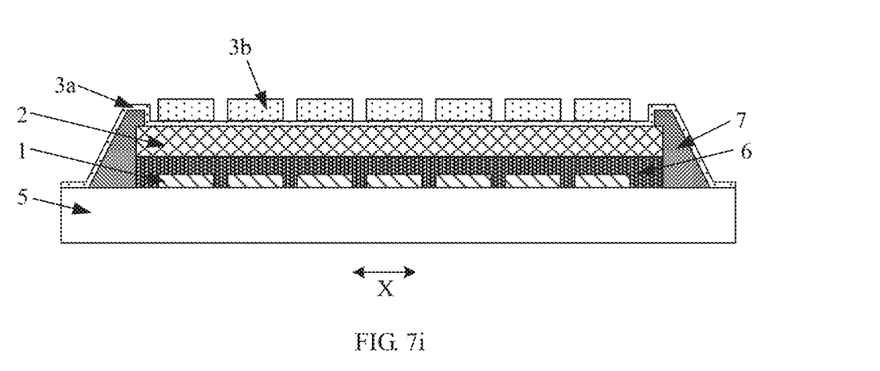
Figure 7J:
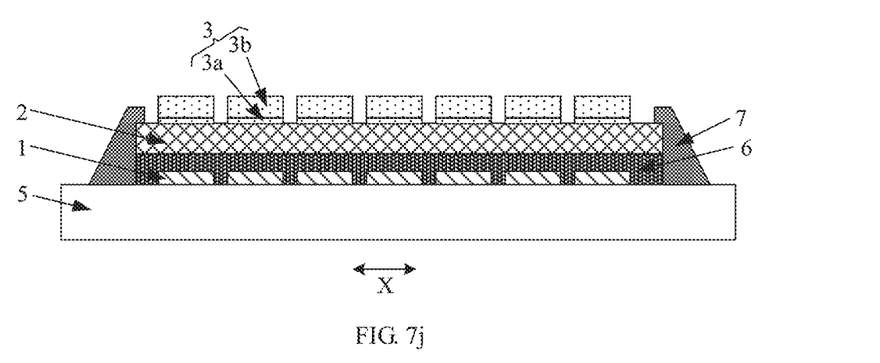

FIG. 6 is a flow chart of another method of fabricating a fingerprint recognition unit according to an embodiment of the present disclosure, and FIGS. 7a to 7j are schematic diagrams of intermediate structures in the process of fabricating a fingerprint recognition unit using the method shown in FIG. 6. As shown in FIGS. 6 to 7j, the method can be used to fabricate the fingerprint recognition unit provided in the forgoing embodiments, and includes steps S201 to S207.

In step S201, a bearing substrate is formed.

Referring to FIG. 7a, for a detailed description of forming the bearing substrate 5, reference may be made to corresponding contents in the foregoing embodiments, and details thereof are not repeated herein.

In step S202, a receiving electrode layer is formed on the bearing substrate.

Referring to FIG. 7b, the receiving electrode layer includes a plurality of receiving electrodes 1, the plurality of receiving electrodes 1 are arranged in an array along the first direction X and the second direction Y, and each receiving electrode 1 is electrically connected to a corresponding fingerprint recognition circuit in the bearing substrate 5.

In step S203, a passivation layer is formed on a side of the receiving electrode layer away from the bearing substrate.

Referring to FIG. 7c, in step S203, a passivation material film is first formed through a deposition process, the passivation material including silicon nitride and/or silicon oxide; the passivation material film is then subjected to a patterning process to obtain a pattern of the passivation layer 6. The passivation layer 6 is located between adjacent receiving electrodes 1 and on surfaces of the receiving electrodes 1 away from the bearing substrate 5.

It should be noted that the patterning process in the present disclosure refers to a process capable of forming a desired pattern. The patterning process generally includes a photolithography process, and specifically includes at least some of photoresist coating, exposure, masking, thin film etching, and photoresist stripping. Needless to say, the patterning process may also include printing, and the like.

In step S204, a piezoelectric material layer is formed on a side of the passivation layer away from the bearing substrate.

Referring to FIG. 7d, a piezoelectric material film is first formed; then, the piezoelectric material film is subjected to a patterning process to obtain a pattern of the piezoelectric material layer 2. In some embodiments, the piezoelectric material includes PVDF.

In some embodiments, the projection of the pattern of the piezoelectric material layer 2 on the base substrate is formed to completely overlap the projection of the pattern of the passivation layer 6 on the base substrate, and the piezoelectric material layer 2 and the passivation layer 6 may be formed using a same mask in the patterning process.

In step S205, an encapsulation pattern is formed on side surfaces of the piezoelectric material layer and the passivation layer.

Referring to FIG. 7e, an encapsulation material film is first formed, the encapsulation material including a photoresist; the encapsulating material film is then subjected to a patterning process to obtain an encapsulation pattern 7. In some embodiments, the encapsulation pattern 7 also covers an edge area of the upper surface of the piezoelectric material layer 2 for better encapsulation.

In some embodiments, a side surface of the encapsulation pattern 7 away from the piezoelectric material layer 2 is a slope surface, and an included angle between the slope surface and the side surface of the piezoelectric material layer 2 is in the range of 30 to 60 degrees.

In step S206, a driving electrode layer is formed on a side of the piezoelectric material layer away from the bearing substrate.

Figure 8:
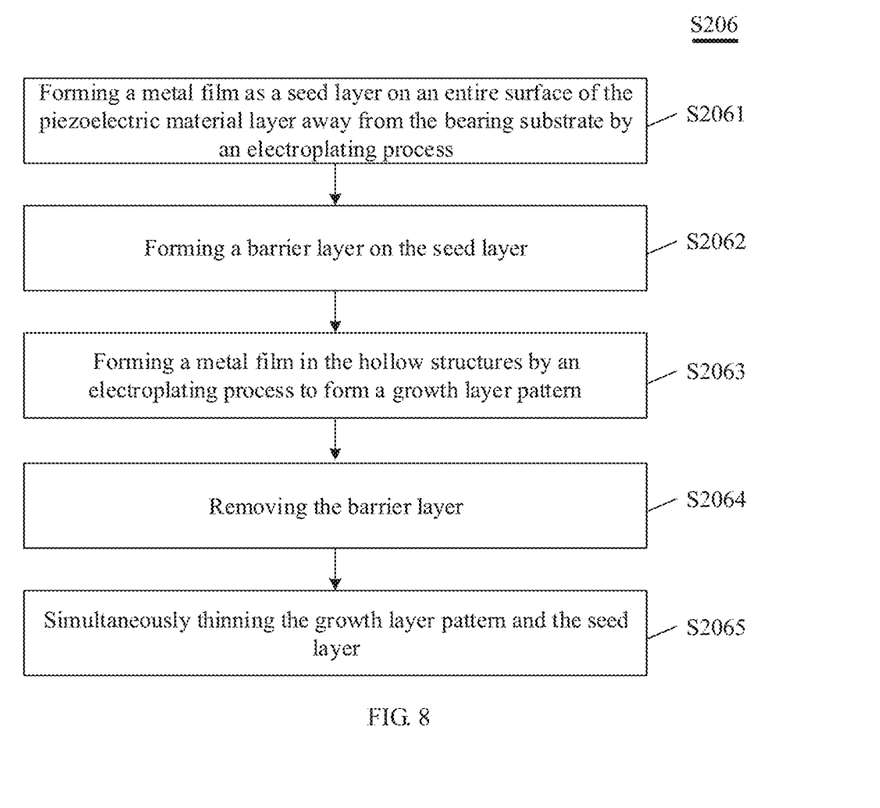
FIG. 8 is a flow chart of a method of forming a receiving electrode layer according to an embodiment of the present disclosure.

FIG. 8 is a flow chart of a method of forming a receiving electrode layer in an embodiment of the present disclosure. As shown in FIG. 8, step S206 includes steps S2061 to S2065.

In step S2061, a metal film is formed as a seed layer on an entire surface of the piezoelectric material layer away from the bearing substrate by an electroplating process.

As shown in FIG. 7f, a metal film is formed as a seed layer 3a on the entire surface of the piezoelectric material layer 2 away from the bearing substrate 5 by an electroplating process. In some embodiments, the material of the seed layer 3a is copper, and the thickness of the seed layer 3a is in the range of 3000 Å to 5000 Å.

In step S2062, a barrier layer is formed on the seed layer.

Referring to FIG. 7g, the barrier layer 10 has hollow structures 11 where the driving electrodes 3 are to be formed.

In some embodiments, the width of the barrier layer between adjacent hollow structures 11 is less than or equal to the pre-designed width between the driving electrodes 3. As an example, the pre-designed width between the driving electrodes 3 is from 8 um to 10 um, and the width of the barrier layer between adjacent hollow structures is from 1 um to 7 um. The thickness of the barrier layer is greater than the thickness of the driving electrode 3 to be formed.

In step S2063, a metal film is formed in the hollow structures by an electroplating process to form growth layer patterns.

Referring to FIG. 7h, the metal material for electroplating in step S2063 is the same as the metal material for electroplating in step S2061. In some embodiments, the metal material for electroplating in steps S2063 and S2061 is copper. The thickness of the growth layer patterns 3b in step S2063 is determined according to actual needs.

In S2064, the barrier layer is removed.

Referring to FIG. 7i, the barrier layer is dissolved using a solvent so that areas of the seed layer 3a not covered by the growth layer patterns 3b are exposed.

In step S2065, the growth layer patterns and the seed layer are thinned simultaneously.

Referring to FIG. 7j, the growth layer patterns and the seed layer are thinned simultaneously by a dry etching process, portions of the seed layer not covered by the growth layer patterns are completely removed, the material of the upper surfaces and the side surfaces of the growth layer patterns is partially removed, and the remaining portions of the growth layer patterns and the portions of the seed layer covered by the remaining portions of the growth layer patterns constitute the driving electrodes 3.

It should be noted that, in the process of thinning the growth layer patterns and the seed layer simultaneously, since the side surfaces of the growth layer pattern are also etched, the area of the cross-section of the growth layer pattern is reduced, and the distance between adjacent growth layer patterns is increased. Therefore, when designing the barrier layer 10 in step S2062, the area where the hollow structure is located may be greater than the area where the driving electrode 3 is to be formed, and the width of the barrier layer between adjacent hollow structures 11 is smaller than the pre-designed width between the driving electrodes 3, so as to reduce the error between the size of the product finally produced by the production line and the design size.

In some embodiments, the material of the driving electrode 3 is copper, and the thickness of the driving electrode 3 is in the range of 14 um to 45 um.

The fabrication of the driving electrodes 3 can be completed based on the above steps S2061 to S2065. Needless to say, step S103 in the foregoing embodiment may also be implemented by steps S2061 to S2065.

In step S207, a protective layer is formed on a side of the driving electrode layer away from the bearing substrate.

Referring to FIG. 2, the protective layer 8 and the encapsulation pattern 7 may serve to protect the fingerprint recognition unit.

Based on steps S201 to S207, the fingerprint recognition unit provided in the forgoing embodiments can be fabricated. In the fingerprint recognition unit according to the present disclosure, the driving electrode can not only realize fingerprint recognition driving, but also function as the acoustic matching layer. Therefore, the fingerprint recognition unit according to the embodiments of the present disclosure does not need to be additionally provided with the acoustic matching layer and the isolation layer, so that the device structure is simplified, and short circuit caused by breakdown between the driving electrode and the acoustic matching layer is effectively avoided.

It could be understood that the above embodiments are merely exemplary embodiments adopted for describing the principle of the present disclosure, but the present disclosure is not limited thereto. Various variations and improvements may be made by those of ordinary skill in the art without departing from the spirit and essence of the present disclosure, and these variations and improvements shall also be regarded as falling into the protection scope of the present disclosure.

What is claimed is:

1. A fingerprint recognition unit, comprising:
a bearing substrate,
a receiving electrode layer on the bearing substrate,
a piezoelectric material layer on a side of the receiving electrode layer away from the bearing substrate; and
a driving electrode layer on a side of the piezoelectric material layer away from the receiving electrode layer;
wherein a density of the driving electrode layer is greater than 5 g/cm$^3$, and a thickness of the driving electrode layer, a thickness of the piezoelectric material layer and a thickness of the bearing substrate are configured such that a vibration nodal plane of the piezoelectric material layer is within the piezoelectric material layer.

2. The fingerprint recognition unit of claim 1, wherein the receiving electrode layer comprises a plurality of receiving electrodes arranged in an array along a first direction and a second direction intersecting the first direction, and
the driving electrode layer comprises a plurality of driving electrodes arranged along the first direction, each driving electrode is a strip electrode extending along the second direction, and an orthographic projection of each driving electrode on the bearing substrate overlaps orthographic projections of multiple receiving electrodes arranged along the second direction on the bearing substrate.

3. The fingerprint recognition unit of claim 2, wherein the orthographic projections of the multiple receiving electrodes arranged along the second direction on the bearing substrate are within the orthographic projection of a corresponding driving electrode on the bearing substrate.

4. The fingerprint recognition unit of claim 1, wherein a material of the driving electrode layer comprises copper.

5. The fingerprint recognition unit of claim 1, wherein
the thickness of the driving electrode layer is in the range of 14 um to 45 um;
the thickness of the piezoelectric material layer is in the range of 8 um to 10 um; and
the thickness of the bearing substrate is in the range of 90 um to 120 um.

6. The fingerprint recognition unit of claim 2, wherein the bearing substrate comprises: a base substrate and a fingerprint recognition circuit layer on the base substrate, the receiving electrode layer is on a side of the fingerprint recognition circuit layer away from the base substrate; and
the fingerprint recognition circuit layer comprises a plurality of fingerprint recognition circuits in one-to-one correspondence with the plurality of receiving electrodes, and each fingerprint recognition circuit is electrically connected to a corresponding receiving electrode.

7. The fingerprint recognition unit of claim 2, further comprising a passivation layer between the receiving electrode layer and the piezoelectric material layer.

8. The fingerprint recognition unit of claim 1, wherein a material of the piezoelectric material layer comprises: polyvinylidene fluoride.

9. The fingerprint recognition unit of claim 1, further comprising an encapsulation pattern covering a side surface of the piezoelectric material layer.

10. The fingerprint recognition unit of claim 9, wherein a side surface of the encapsulation pattern away from the piezoelectric material layer is a slope surface, and an included angle between the slope surface and the side surface of the piezoelectric material layer is in the range of 30 to 60 degrees.

11. The fingerprint recognition unit of claim 10, further comprising a lead wire arranged along the slope surface, wherein the lead wire is connected to the driving electrode layer.

12. The fingerprint recognition unit of claim 1, further comprising a protective layer on a side of the driving electrode layer away from the piezoelectric material layer.

13. The fingerprint recognition unit of claim 12, wherein a material of the protective layer comprises an organic resin material, and a thickness of the protective layer is greater than a thickness of the driving electrode layer.

14. The fingerprint recognition unit of claim 2, wherein a width of the driving electrode is in the range of 65 um to 70 um, an interval between adjacent driving electrodes is in the range of 8 um to 10 um; and
    the receiving electrode is a rectangular electrode, any side length of the rectangular electrode is in the range of 65 um to 70 um, and an interval between adjacent rectangular electrodes is in the range of 8 um to 10 um.

15. A fingerprint recognition module, comprising a plurality of fingerprint recognition units arranged in an array, wherein the fingerprint recognition unit is the fingerprint recognition unit of claim 1.

16. A display device, comprising: the fingerprint recognition module of claim 15.

17. A method of fabricating a fingerprint recognition unit, comprising:
    forming a bearing substrate,
    forming a receiving electrode layer on the bearing substrate;
    forming a piezoelectric material layer on a side of the receiving electrode layer away from the bearing substrate; and
    forming a driving electrode layer on a side of the piezoelectric material layer away from the receiving electrode layer, wherein a density of the driving electrode layer is greater than 5 $g/cm^3$, and a thickness of the driving electrode layer, a thickness of the piezoelectric material layer and a thickness of the bearing substrate are configured such that a vibration nodal plane of the piezoelectric material layer is within the piezoelectric material layer.

18. The method of claim 17, wherein forming the driving electrode layer comprises forming the driving electrode layer having a certain thickness by a metal electroplating process.

19. The method of claim 18, wherein forming the driving electrode layer having the certain thickness by the metal electroplating process comprises:
    forming a copper film as a seed layer on an entire surface of the piezoelectric material layer away from the bearing substrate by an electroplating process, wherein a thickness of the seed layer is in the range of 3000 Å to 5000 Å;
    forming a barrier layer on the seed layer, wherein the barrier layer has a hollow structure, and a thickness of the barrier layer is larger than a thickness of a driving electrode to be formed;
    forming a copper film in the hollow structure by an electroplating process to form a growth layer pattern;
    removing the barrier layer; and
    simultaneously thinning the growth layer pattern and the seed layer, so that a portion of the seed layer which is not covered by the growth layer pattern is completely removed, and remaining portion of the growth layer pattern and a portion of the seed layer which is covered by the remaining portion constitute the driving electrode.

* * * * *